(12) United States Patent
Lucas

(10) Patent No.: US 8,876,184 B2
(45) Date of Patent: Nov. 4, 2014

(54) PACKAGE TRAY WITH CARGO CATCHMENT

(75) Inventor: Marc Jonathon Lucas, Remagen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/359,958

(22) Filed: Jan. 27, 2012

(65) Prior Publication Data
US 2013/0193708 A1    Aug. 1, 2013

(51) Int. Cl.
*B60R 7/00* (2006.01)

(52) U.S. Cl.
USPC .................................... 296/24.44; 296/37.16

(58) Field of Classification Search
CPC ................................ B60R 21/06; B60P 3/007
USPC ........ 296/24.43, 24.44, 37.16, 24.4; 410/117, 410/118, 121, 129
See application file for complete search history.

(56) References Cited

U.S. PATENT DOCUMENTS

| | | | |
|---|---|---|---|
| 5,011,208 A | 4/1991 | Lewallen | |
| 5,632,520 A | 5/1997 | Butz | |
| 6,155,621 A * | 12/2000 | Nishida et al. | 296/24.4 |
| 6,176,535 B1 | 1/2001 | Chaloult et al. | |
| 6,290,277 B1 | 9/2001 | Spykerman et al. | |
| 6,416,105 B2 * | 7/2002 | Butz | 296/37.16 |
| 6,461,090 B1 * | 10/2002 | Faber et al. | 410/100 |
| 6,626,477 B2 | 9/2003 | Maynard et al. | |
| 6,702,355 B1 | 3/2004 | Price et al. | |
| 6,874,667 B2 | 4/2005 | Dykstra et al. | |
| 6,905,155 B1 | 6/2005 | Presley et al. | |
| 7,004,274 B2 | 2/2006 | Shibasawa et al. | |
| 7,481,477 B2 | 1/2009 | Yang | |
| 7,690,686 B2 | 4/2010 | Hashimura et al. | |
| 7,766,422 B2 | 8/2010 | Edwards et al. | |
| 7,789,454 B2 | 9/2010 | Kim et al. | |
| 8,186,736 B2 * | 5/2012 | Jouraku | 296/37.16 |
| 8,353,550 B1 * | 1/2013 | Lucas | 296/37.16 |
| 2006/0181103 A1 | 8/2006 | Khan et al. | |
| 2009/0104511 A1 | 4/2009 | Maguire et al. | |
| 2010/0170736 A1 * | 7/2010 | Watanabe et al. | 180/68.5 |

FOREIGN PATENT DOCUMENTS

| | | |
|---|---|---|
| DE | 19737712 A1 | 3/1999 |
| DE | 102007042883 A1 | 3/2009 |
| DE | 102010042439 A1 | 5/2011 |
| EP | 1800940 A2 | 6/2007 |

(Continued)

OTHER PUBLICATIONS

German Search Report, Application No. 10 2012 210 924.2, dated Feb. 5, 2013.

(Continued)

*Primary Examiner* — Dennis H Pedder
*Assistant Examiner* — Beverly Becker
(74) *Attorney, Agent, or Firm* — Brooks Kushman P.C.; David B. Kelley

(57) ABSTRACT

A vehicle is provided that includes a traction battery housing located rearward of a rear seat. The rear seat is foldable between a seating position and a storage position. A package tray is provided that is attachable to the vehicle in a first position generally vertically spaced from the battery housing, and a second position generally abutting and forward of the battery housing. The package tray includes a pair of rotatable posts and a net connecting the posts. The package tray further includes receptacles formed on the package tray for receiving the posts when the posts are rotated downward towards the package tray.

15 Claims, 3 Drawing Sheets

(56) References Cited

FOREIGN PATENT DOCUMENTS

| | | | |
|---|---|---|---|
| FR | 2863230 | A1 | 6/2005 |
| FR | 60019694 | T2 | 5/2006 |
| FR | 2890015 | A1 | 3/2007 |
| GB | 2064950 | A | 6/1981 |
| JP | 5008677 | A | 1/1993 |
| JP | 11048870 | A | 2/1999 |
| JP | 2002160564 | A | 6/2002 |
| JP | 2005199878 | A | 7/2005 |
| JP | 2010116029 | A | 5/2010 |
| WO | 2010051646 | A1 | 5/2010 |

OTHER PUBLICATIONS

German Search Report, Application No. 10 2012 210 964.1, dated Sep. 6, 2013.

* cited by examiner

US 8,876,184 B2

PACKAGE TRAY WITH CARGO CATCHMENT

TECHNICAL FIELD

The present disclosure relates to a package tray for use in a vehicle.

BACKGROUND

Electric vehicles and hybrid-electric vehicles typically include one or more high voltage traction batteries that are physically larger than conventional vehicle batteries. These high voltage batteries may be too large to be packaged in the engine compartment of the vehicle, and are therefore typically packaged elsewhere in the vehicle. Interior storage volume within the vehicle may be reduced if the battery is packaged rearward of the engine compartment.

SUMMARY

According to one aspect of the present disclosure, a vehicle includes a seat back coupled to a vehicle body. The seat back is pivotable between an upright position and a folded position. A battery housing is disposed rearward of the seat back. The battery housing has an upper surface that defines a first load surface. A tray is attachable to the vehicle body in a first position and a second position. The first position is generally vertically spaced from the upper surface of the battery housing. The second position is generally adjacent to and forward of the battery housing. The tray defines a second load surface, such that the first and second load surfaces are contiguous when the tray is attached in the second position. A pair of posts are connected to a forward portion of the tray. The posts are moveable relative to the tray between an upright position and a collapsed position. The upright position is generally perpendicular to the tray and the collapsed position is generally parallel to the tray. A net connects to the posts and extends between the posts. The net inhibits forward movement of items placed on the tray when the tray is in both the first and second positions.

According to another aspect of the present disclosure, a package tray assembly comprises a package tray having a forward portion and a rearward portion. A pair of posts are pivotally connected to the forward portion of the package tray. The posts are moveable between a use position and a storage position and a net may be connected to the posts. A pair of receptacles are formed on the forward portion of the package tray. The receptacles receive the posts when the posts are rotated into the collapsed position.

According to another aspect of the present disclosure, a vehicle comprises a vehicle body defining a passenger compartment and a storage compartment rearward of the passenger compartment. A seat is disposed in the passenger compartment. The seat includes a seat back connected to the vehicle body that is pivotable between an upright position and a folded position. A battery housing is disposed rearward of the seat and within the storage compartment. The battery housing has an upper surface that defines a first load surface. A tray defines a second load surface. The tray is moveable between a first position and a second position. In the first position, the tray is disposed above and vertically spaced from the upper surface of the battery housing. In the second position, the tray is disposed generally adjacent to and forward of the battery housing. The tray defines a second load surface. The first and second load surfaces are contiguous when the tray is attached in the second position. A pair of posts are connected to a forward portion of the tray by a pivot pin. The posts are pivotable relative to the tray between an upright position generally perpendicular to the tray, and a collapsed position generally parallel with the tray. A pair of grooves are provided on the tray that each receive one of the respective posts when the posts are in the collapsed position. A net is connected to the pair of posts.

DETAILED DESCRIPTION

Detailed embodiments of the present invention are disclosed herein. It is to be understood that the disclosed embodiments are merely exemplary of the invention that may be embodied in various and alternative forms. The figures are not necessarily to scale, as some features may be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features of the embodiments illustrated and described with reference to any one of the figures may be combined with features illustrated in one or more other figures to produce embodiments that are not explicitly illustrated or described. The use of the same reference number for similar features in other figures is for clarity purposes, and in no way limits the features to being the same throughout the various figures.

Figure 1:
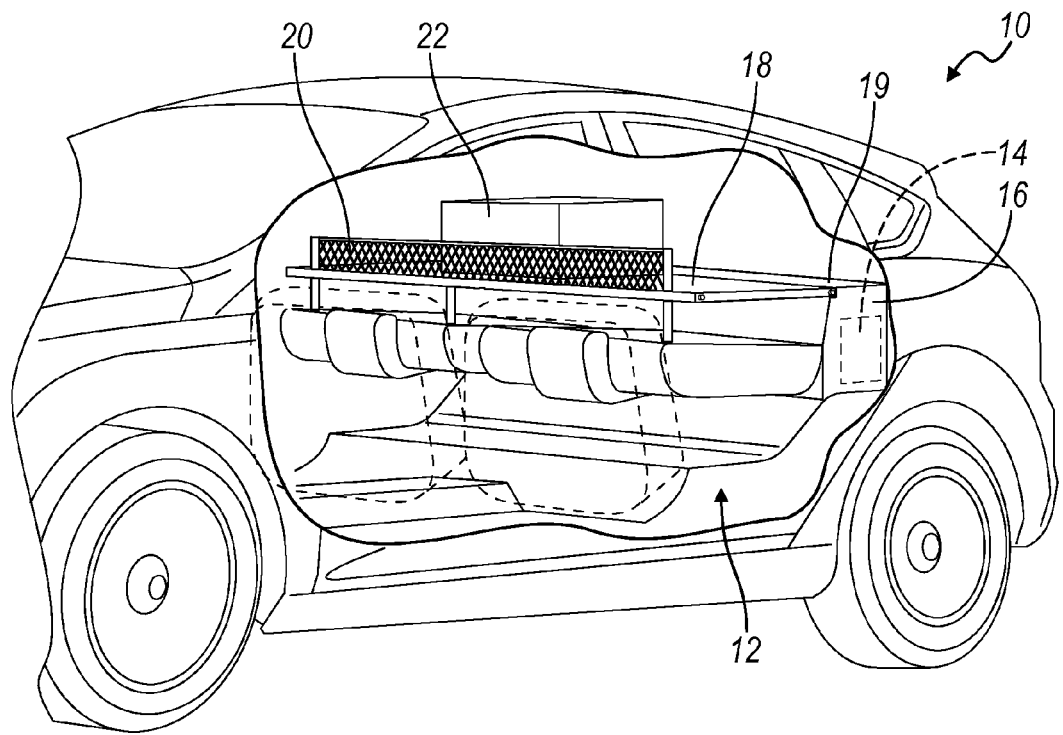
FIG. 1 is a fragmentary perspective view of a vehicle with a package tray attached to a body of the vehicle.

Referring to FIG. 1, a vehicle 10 is illustrated that may be a hybrid electric vehicle (HEV), battery electric vehicle (BEV), or any other vehicle in which a traction battery is utilized to provide electric power to a traction motor to propel the vehicle 10. The vehicle 10 has a vehicle body 12. A high voltage battery, or traction battery, 14 is disposed within the vehicle body 12, and is at least partially surrounded by a battery housing 16. A package tray, or tray 18 is removably attached to the vehicle body 12 and extends from the battery housing 16 towards the front of the vehicle 10. In the position illustrated in FIG. 1, the tray 18 abuts and is contiguous with a top, or upper, surface 19 of the battery housing 16 that creates an extended flat load floor. A collapsible, or foldable net 20 is provided on the tray 18. The net 20 prevents items 22 such as luggage and other cargo from sliding forward on the tray 18 in the event that the vehicle 10 comes to a sudden stop.

Figure 2:
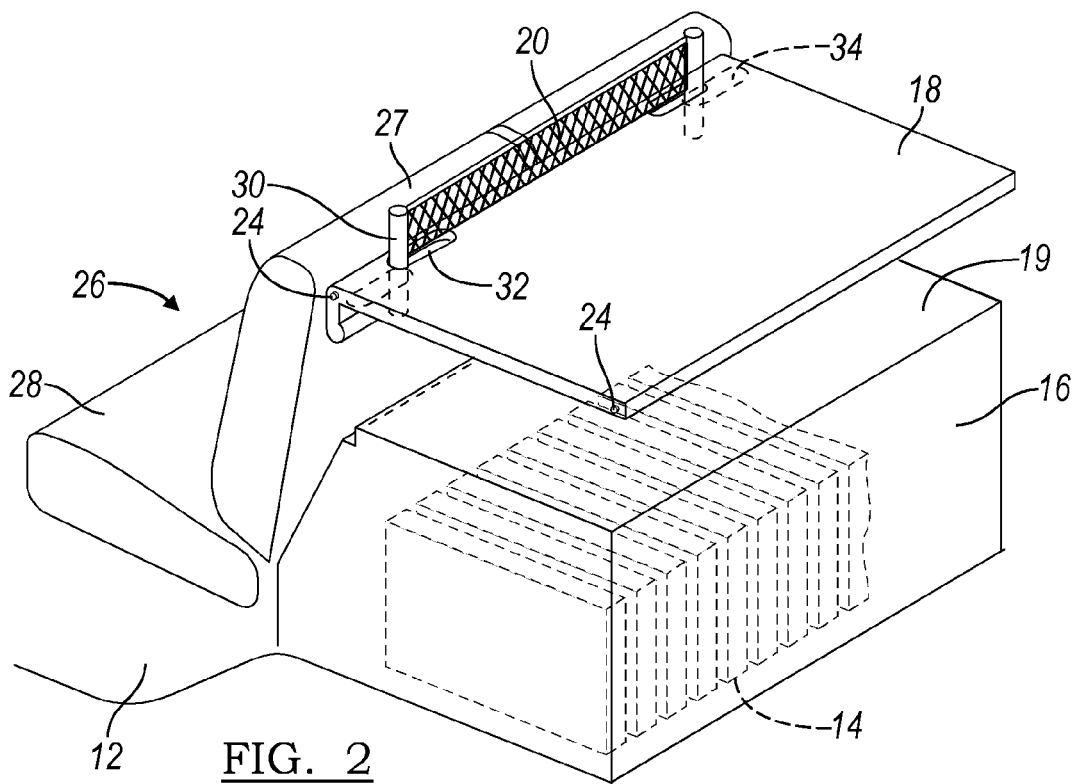
FIG. 2 is a perspective view of the package tray attached above a traction battery housing in a first position.

Referring to FIG. 2, the tray 18 is shown in a first position disposed above the battery housing 16. The traction battery 14 includes a plurality of battery cells aligned in an array, and packaged within the battery housing 16. The battery 14 provides electric power to a traction motor (not shown) to propel the vehicle 10. The battery 14 receives and stores energy from a plug-in charger, a hybrid internal combustion engine regenerative braking or any other known method for charging the batteries of BEVs or HEVs.

Where the tray 18 is attached to the vehicle in the first position, protrusions 24 are provided at various locations along the side surfaces of the tray 18 that attach the tray 18 to corresponding surface features, or recesses, 25 formed in the vehicle body 12. The surface features 25 may include grooves, slots, holes, or other recesses or cavities sized to receive the protrusions 24. Protrusions 24 may be located near the four corners of the tray 18. Alternatively, the vehicle body 12 may include the protrusions 24 while the tray includes corresponding surface features at the corners of the tray 18. The surface features 25 formed either on the vehicle body 12 or the tray 18 enable a user to easily locate and guide the protrusions 24 into the surface features to attach the tray 18 to the vehicle body 12.

In the first position, the tray 18 is attached to the vehicle body 12 at a location rearward of a rear seat 26. The rear seat includes a seat back 27 and a seat bottom 28 that are shown in their upright, seating position. The net 20 is disposed on a forward portion of the tray 18. The net 20 is held upright by a pair of posts 30. The posts 30 are shown in their upright, or use position, extending above and below the upper and lower surfaces of the tray 18. The posts 30 pivot between an upright, or extended position to a collapsed, or storage position. The posts 30 pivot into the tray 18 in the storage position. Top and bottom receptacles 32 and 34 are formed on upper and lower surfaces of the tray 18, respectively. The receptacles 32, 34 may be grooves, slots, holes, or other surface features that are adopted to receive the posts 30. The top receptacles 32 are adjusted to receive an upper portion of the posts 30, while bottom receptacles 34 are adopted to receive a lower portion of the posts 30 when the posts are pivoted to the collapsed position. In the collapsed position, the posts 30 are generally parallel with the tray 18 and disposed at least partially within the receptacles 32, 34. Additional detail of the receptacles 32, 34 and pivoting the posts 30 is provided below with reference to FIGS. 4 and 5.

Figure 3:
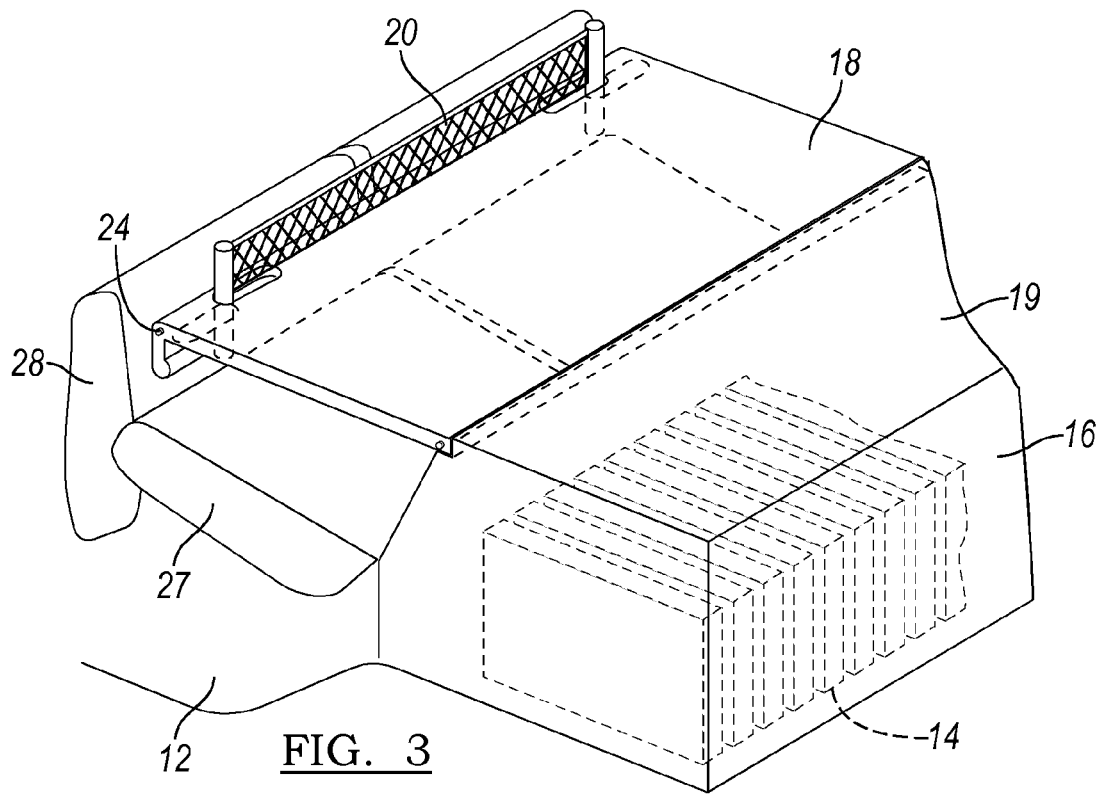
FIG. 3 is a perspective view of the package tray attached adjacent to the traction battery housing in a second position.

Referring to FIG. 3, the tray 18 is attached to the vehicle body in a second position. In the second position, the rear seat 26 is folded into a storage position in which the seat back 27 is folded downward and the seat bottom 28 is rotated forward. It should be understood that while both the seats back 27 and seat bottom 28 are shown folded into the storage position in such a manner, in another embodiment only the seat back 27 is folded downward to allow for attachment of the tray 18 in the second position. Additional surface features 25 and/or protrusions are formed in the vehicle body 12 at locations such that the tray 18 may be removed and attached in either of the first or second positions The tray 18 is aligned with a top surface of the battery housing 16 when the tray 18 is attached in the second position. A flat load surface spans the tray 18 and the top surface 19 of the battery housing 16 is provided. The extended flat load surface 18, 19 enables many items, or relatively long items, to be loaded into the vehicle 10 by sliding the items along the flat load surface created by the combination of the battery housing 16 and the tray 18. The foldable net 20 prevents the items from sliding too far forward on the tray 18, potentially injuring or distracting occupants in the vehicle 10.

Referring to FIGS. 2 and 3, the tray 18 provides a user with a rigid loading surface that may be attached to the vehicle body 12 in multiple positions. In the first position, shown in FIG. 2, the protrusions 24 connect the tray 18 the vehicle body 12 at a position elevated from the battery housing 16. A rear hatch or door may be opened (not shown), and items may be loaded into the storage compartment of the vehicle either on top of the tray 18, or on top of the battery housing 16. The net 20 inhibits items from sliding forward and off at the tray 18. The seat back 27 and seat bottom 28 may be folded down and the tray 18 may be moved from the first position and reattached to the vehicle body 12 in the second position. In the second position, the tray 18 generally abuts the battery housing 16 with the tray 18 and the top surfaces of the battery housing 16 in horizontal alignment. This combines the loading surfaces of each into one continuous loading surface.

Figure 4:
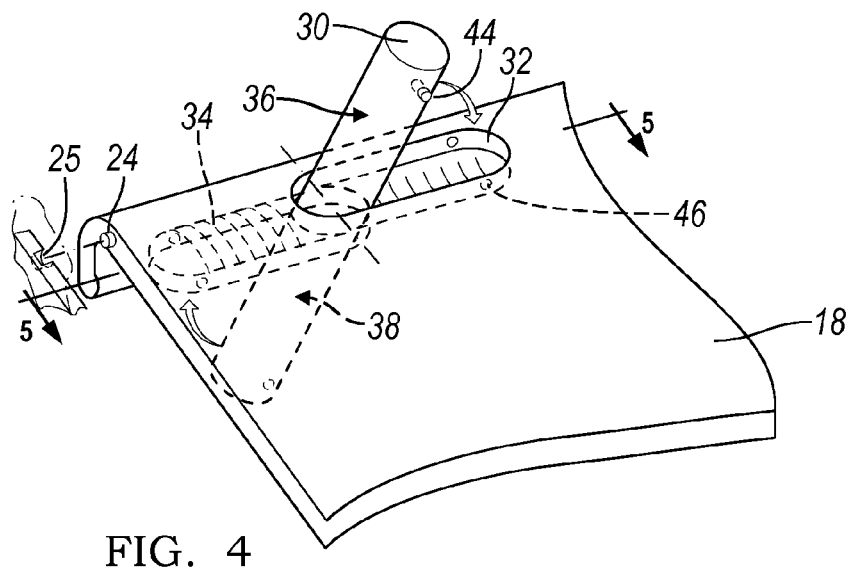
FIG. 4 is a fragmentary perspective view of a pivotable post connected to the package tray according to one embodiment of the present disclosure.
Figure 5:
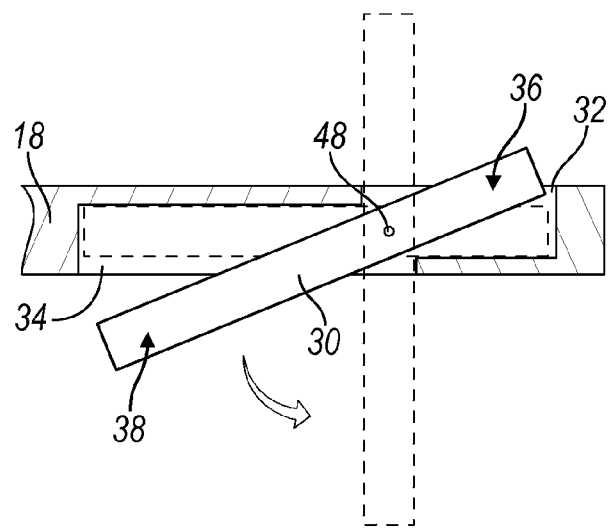
FIG. 5 is a fragmentary cross-sectional view of the post taken along the line 5=5 in FIG. 4 according to one embodiment of the present disclosure.

Referring to FIGS. 4 and 5, the rotatable posts 30 are shown as they are pivoted between an upright position and a collapsed position. When the posts 30 are in the upright position, the posts 30 are generally perpendicular to the tray 18, thereby holding the net 20 erect relative to the tray 18. In the upright position, each post 30 includes an upper portion 36 that extends above the tray 18, and a lower portion 38 that extends below the tray 18. In the collapsed position, the upper portion 36 of the post 30 pivots into the top receptacle 32 formed on the upper surface of the tray 18, and the lower portion 38 pivots into the bottom receptacle 34 formed in the lower surface of the tray 18. Each receptacle 32, 34 may be of a half-cylindrical or have a partial-circle cross-sectional shape. Alternatively, each receptacle may have side walls that extend from the outer surface of the tray 18 and toward a concave floor of the receptacle 32, 34. The receptacles 32, 34 are adopted to receive and retain the post 30. The post 30 and/or the tray 18 slightly deforms to receive the post 30 within the receptacles 32, 34. The post 30 may also include at least one detect button 44 that fits within a corresponding cavity 46 formed within each of the receptacles 32, 34. Each of the receptacles 32, 34 may be slightly longer than the length of the upper portion 36 and lower portion 38, respectively, to provide access for a user to rotate the post 30 out of the receptacles 32, 34.

As illustrated in FIG. 5, a pivot pin 48 may also be provided that extends through the tray 18 and the post 30 to pivotally secure the post 30 to the tray 18. The pivot pin 48 may be located at a position that is longitudinally offset on the posts 30. The upper portion 36 of the post 30 may be either shorter or longer relative to the lower portion 38. Receptacle 32 may be smaller than receptacle 34 to receive a relatively short upper portion 36 of the post 30 and a relatively long lower portion 38. The lower portion 38 may also act as a leg to provide additional support for the tray 18 from beneath, as will be discussed with reference to FIG. 7 below.

Figure 6:
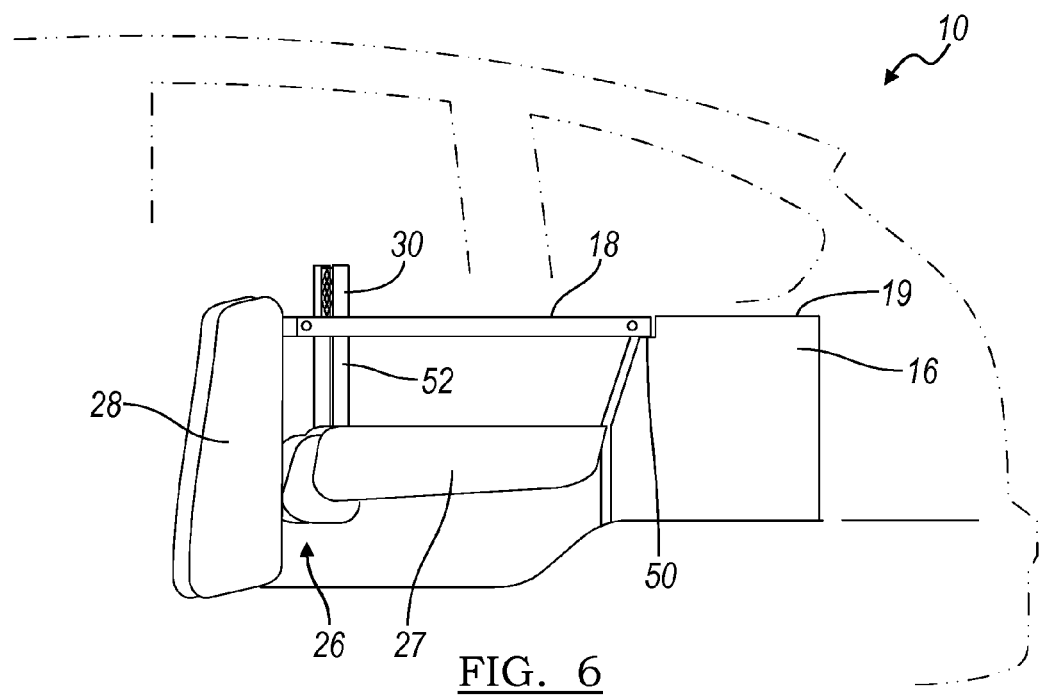
FIG. 6 is a diagrammatic side view of an interior of the vehicle with the package tray attached adjacent to the traction battery housing.

Referring to FIG. 6, the rear seat 26 in the vehicle 10 is its storage position, in which the seat back 27 is folded downward and the seat bottom 28 is rotated towards the front of the vehicle 10. The tray 18 is connected to the vehicle 10 in the second position, creating a flat load surface spanning the upper surface 19 of the battery housing 16 and the tray 18. A ledge 50 is formed on a corner of the battery housing 16 to provide a support surface for the rear portion of the tray 18. Foldable legs 52 may also be provided that extend downward from the lower surface of the tray 18. When the legs 52 are folded outward from the tray 18, the legs engage the seat back 27 so that the seat back 27 supports the tray 18 from beneath. The legs 52 may be pivotally fastened to the tray 18 and may include springs to bias the legs 52 toward the tray 18. While the legs 52 may be separate parts assembled to the tray 18, the legs 52 may alternatively be defined by the lower portion 38 of the posts 30. For example, in the embodiment shown in FIG. 5, the lower portions 38 of the posts 30 may act as legs 52 when extended in their upright position, such that the lower portions 38 contact the seat back 27 and supports the tray 18.

Figure 7:
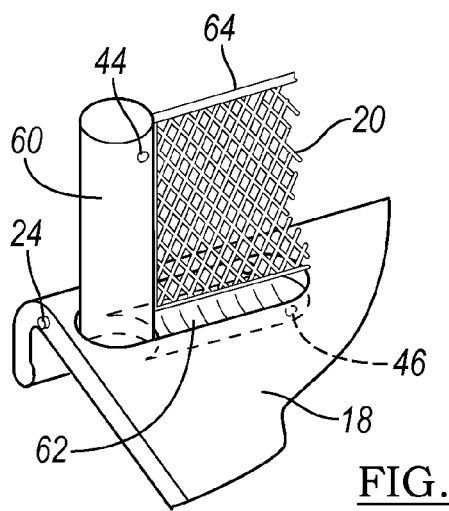
FIG. 7 is a fragmentary perspective view of the package tray and the pivotable post according to another embodiment of the present disclosure.

Referring to FIG. 7, another embodiment of the post 60 is illustrated that does not extend through the tray 18. Two posts 60 are provided on the tray 18 to support opposite ends of the net 20. The post 60 folds into the receptacle 62 formed on the upper surface of the tray 18. A hinge, pin, socket, or the like may be used to connect the post 60 to the tray 18 to allow the post 60 to be repositioned in the receptacle. A relatively rigid crossbar 64 is also illustrated, and may be provided with any embodiment of the present disclosure. The crossbar 64 is sewn or otherwise connected to a top portion of the net 20, and connects both posts 60 together. The crossbar 64 ties the posts 30 together so that both posts 60 rotate together between the upright and collapsed positions. When a crossbar 49 is utilized, the posts 30 on either side of the tray 18 should be located on the same longitudinal ends of their respective receptacle 62. For example, the post 30 is shown to be on the left end of the receptacle 62, and another post (not shown) on the opposite end of the tray 18 would be located on the left end of its corresponding receptacle. Both posts 60 fold in the same direction, as guided by the crossbar 64 connecting both posts 30. A long groove (not shown) may be formed in the upper surface of the tray 18 spanning between the receptacles 32 in order to receive the crossbar 64 as the posts are folded to their collapsed position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a seat back coupled to a vehicle body and pivotable between an upright position and a folded position;
   a battery housing disposed rearward of the seat back and having an upper surface defining a first load surface;
   a tray attachable to the vehicle body in a first position and a second position, in the first position the tray is spaced above the battery housing, and in the second position the tray is forward of the upper surface of the battery housing, the tray defining a second load surface that is contiguous with the first load surface when the tray is attached in the second position;
   a pair of posts connected to a forward portion of the tray, the posts being moveable relative to the tray between an upright position generally perpendicular to the tray and a collapsed position generally parallel with the tray; and
   a net connected to and extending between the posts to inhibit items placed on the tray from moving off of the forward portion of the tray in both the first and second positions.

2. The vehicle of claim 1, wherein the tray includes a first pair of receptacles formed on an upper surface of the tray that receive respective posts when the posts are in the collapsed position.

3. The vehicle of claim 2, wherein the posts extend through the upper surface and a lower surface of the tray in the upright position.

4. The vehicle of claim 3, wherein the tray further includes a second pair of receptacles formed on the lower surface of the tray that receive respective lower portions of the posts when the posts are in the collapsed position.

5. The vehicle of claim 4, wherein the posts are received within both the first pair of receptacles and the second pair of receptacles when the posts are in the collapsed position.

6. The vehicle of claim 2, wherein the posts are generally cylindrical, and a cross-section of the receptacles are of a partial-circle shape.

7. The vehicle of claim 1, wherein one of the tray and the vehicle body includes a protrusion, and the other of the tray and the vehicle body defines a recess adopted to receive the protrusion to connect the tray to the vehicle body.

8. A package tray assembly comprising:
   a package tray having a forward portion and a rearward portion;
   a pair of posts rotatably connected to the forward portion of the package tray and moveable between a use position and a storage position;
   a net connecting the posts; and
   a pair of receptacles formed in the forward portion of the package tray for receiving the posts when the posts are in the storage position;
   wherein the package tray connects to a vehicle having a traction battery housing, the package tray is connected to the vehicle in a first position spaced above the housing and in a second position contiguous with an upper surface of the housing to define a generally flat load floor across the upper surface of the housing and the package tray.

9. The package tray assembly of claim 8, wherein the receptacles are formed on an upper surface and a lower surface of the package tray and the posts extend through the package tray such that when the posts are in the storage position an upper portion of the posts is received in the receptacles on the upper surface and a corresponding lower portion of the posts is received in the receptacles on the lower surface.

10. The package tray assembly of claim 8, further comprising a rigid crossbar integral with the net to facilitate pivoting both of the posts between the use position and the storage position.

11. The package tray assembly of claim 8, further comprising a protrusion disposed on one of the forward portion of the package tray and a vehicle body, the protrusion received within a corresponding recess defined by the other of the forward portion and the vehicle body.

12. The package tray assembly of claim 8, further comprising legs extending from a lower surface of the forward portion of the tray, wherein the battery housing supports the rearward portion of the tray and the legs support the forward portion of the tray when the tray is attached in the second position.

13. A vehicle comprising:
   a vehicle body defining a passenger compartment and a storage compartment rearward of the passenger compartment;
   a seat disposed in the passenger compartment, the seat including a seat back connected to the vehicle body that is pivotable between an upright position and folded position;
   a battery housing having an upper surface that defines a first load surface, the battery housing being disposed rearward of the seat and within the storage compartment;
   a tray moveable between a first position that is above and vertically spaced from the upper surface of the battery housing, and a second position generally adjacent to and forward of the battery, the tray defining a second load surface wherein the first and second load surfaces are contiguous when the tray is attached to the vehicle body in the second position;

a pair of posts connected to a forward portion of the tray by a pivot pin, the posts being pivotable relative to the tray between an upright position generally perpendicular to the tray and a collapsed position generally parallel with the tray;

a pair of grooves formed on an upper surface of the tray for receiving one of the respective posts when the posts are in the collapsed position; and a net attached to and connecting the pair of posts.

14. The vehicle of claim 13, further comprising foldable legs extending from a lower surface of the package tray, wherein the battery housing supports a rearward portion of the tray and the legs support the forward portion of the tray when the tray is attached in the second position.

15. The vehicle of claim 13, wherein the posts extend through the upper surface and a lower surface of the tray, and the tray defines a pair of lower grooves formed on a lower surface of the tray for receiving one of the respective posts when the posts are in the collapsed position.

\* \* \* \* \*